Figure 1:
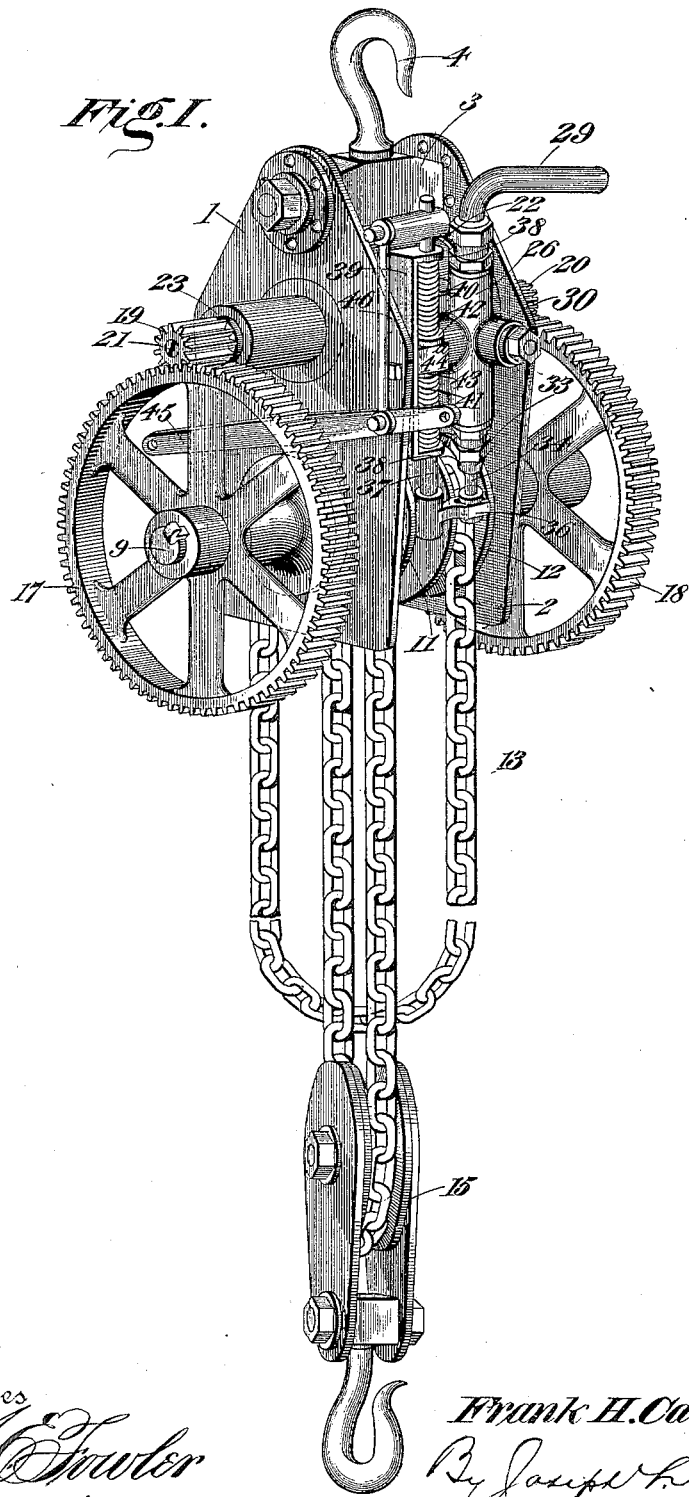

No. 649,399. Patented May 8, 1900.
F. H. CATHCART.
HOIST.
(Application filed July 30, 1898.)
(No Model.) 3 Sheets—Sheet 1.

Witnesses Inventor:
Frank H. Cathcart,
By Joseph L. Atkins,
Attorney.

No. 649,399. Patented May 8, 1900.
F. H. CATHCART.
HOIST.
(Application filed July 30, 1898.)
(No Model.) 3 Sheets—Sheet 2.
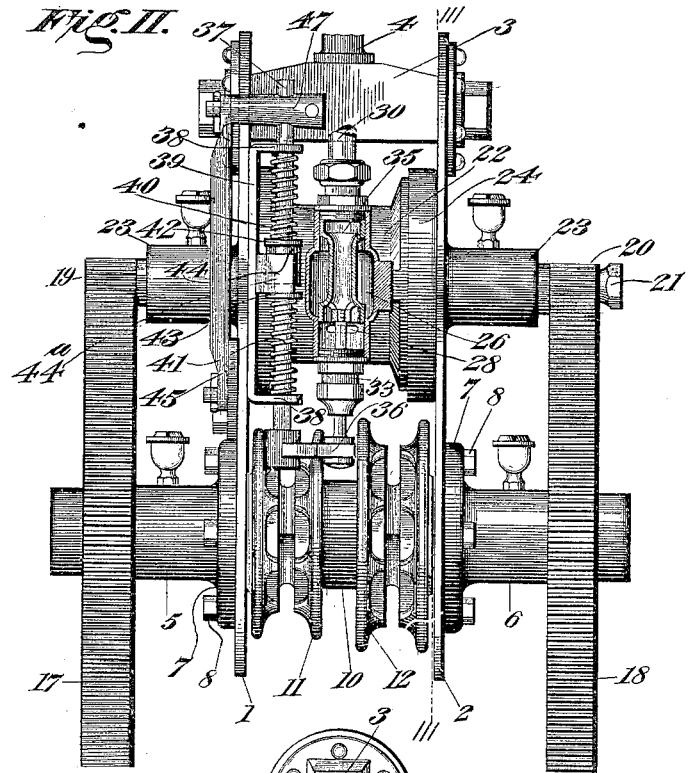
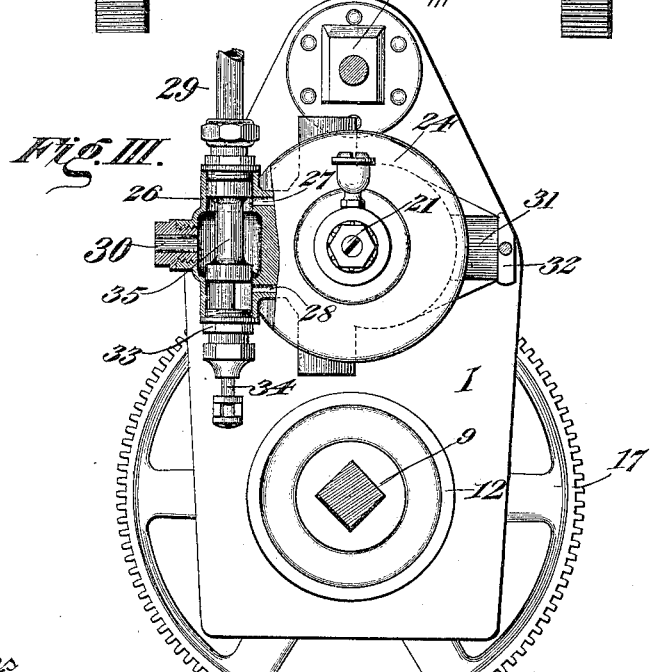
Witnesses
M. Fowler
Stephen F. Brooks
Inventor:
Frank H. Cathcart,
By Joseph W. Atkins
Attorney No. 649,399. Patented May 8, 1900.
F. H. CATHCART.
HOIST.
(Application filed July 30, 1898.)
(No Model.) 3 Sheets—Sheet 3.
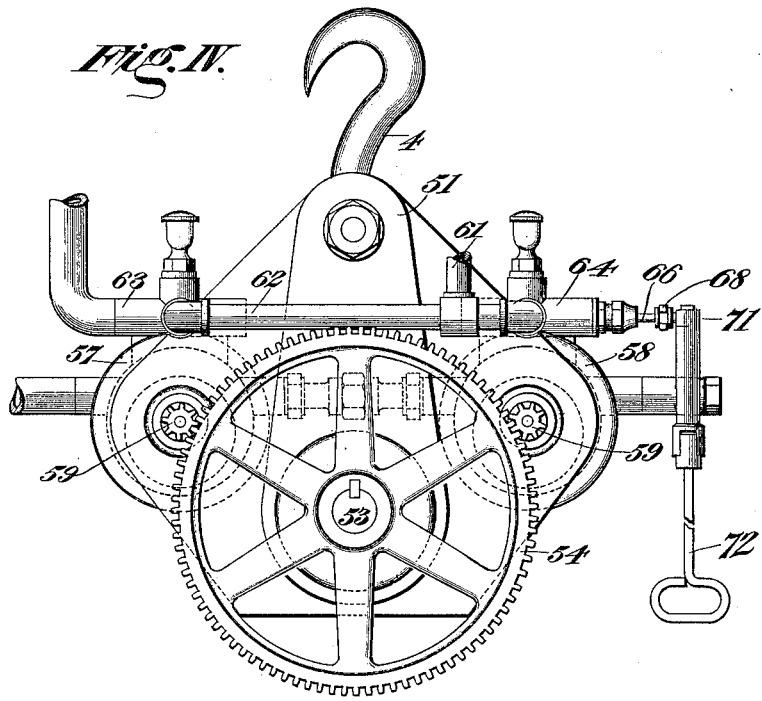
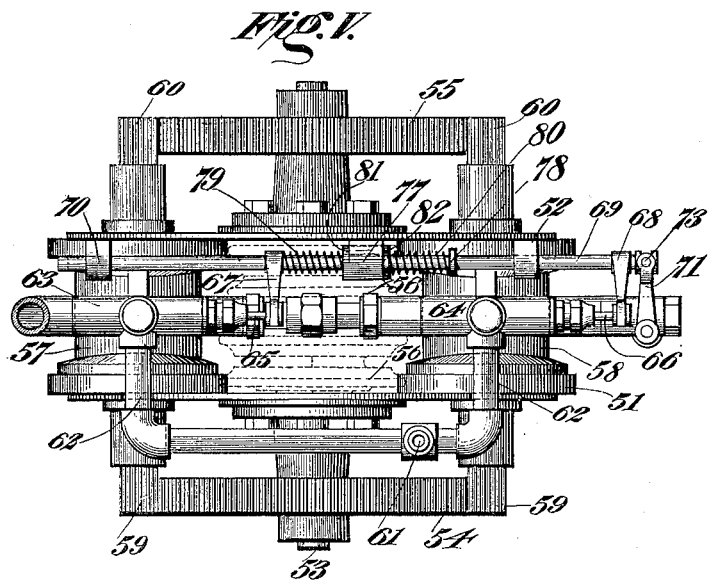
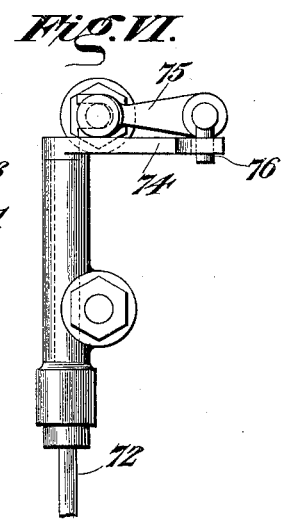
Witnesses Inventor:
Frank H. Cathcart,
By James L. Atkins,
Attorney

UNITED STATES PATENT OFFICE.

FRANK H. CATHCART, OF BLAUVELT, NEW YORK, ASSIGNOR TO THE EMPIRE ENGINE AND MOTOR COMPANY, OF ORANGEBURG, NEW YORK.

HOIST.

SPECIFICATION forming part of Letters Patent No. 649,399, dated May 8, 1900.

Application filed July 30, 1898. Serial No. 687,329. (No model.)

*To all whom it may concern:*

Be it known that I, FRANK H. CATHCART, of Blauvelt, in the county of Rockland, State of New York, have invented certain new and useful Improvements in Hoists, of which the following is a complete specification, reference being had to the accompanying drawings.

The object of my invention is to produce an improved self-contained power-driven hoist, preferably of the differential-pulley type.

Heretofore hoists embodying and operating upon the principle of differential pulleys and the like have been driven by hand-power applied to one loop of the chain passing around the pulleys. By my invention I propose, broadly, to provide means for dispensing with the necessity of the use of hand-power and to incorporate within the hoist mechanism driving mechanism for operating the pulleys, and more specifically to provide mechanism especially designed to accomplish that purpose.

In the accompanying drawings, Figure I is a perspective view of a single-motor hoist complete. Fig. II is a front elevation of the same, partially in section, with parts omitted. Fig. III is a side elevation of the subject-matter of Fig. II with the plate 2 removed, the pulley-shaft and valve-shell being illustrated in section. Fig. IV is a side elevation of a double-motor hoist with the chain omitted. Fig. V is a top plan view of the subject-matter of Fig. IV with the hook and cross-head omitted and the pulleys shown in dotted lines. Fig. VI is a detail view of a slightly-modified form of valve-actuating mechanism.

Referring to the figures on the drawings, 1 and 2 indicate two frame side pieces, which preferably consist of metal plates and may be of any suitable shape and dimensions adapted to do the work required of them. The frame in the form illustrated is completed by the assembling of the side pieces with the driving mechanism, as will hereinafter more fully appear, and is preferably provided at its upper end with a swinging cross-head 3, which carries a hook 4, by which the machine may be suspended in the manner usual with differential hoists. Near the lower ends of the plates, respectively, I provide outwardly-projecting journal-supports 5 and 6, which may be secured to the faces of the plates by base-flanges and crowns of bolts, (indicated, respectively, by the common numerals 7 and 8.) The journals of a pulley-shaft 9 are carried within the supports 5 and 6, respectively. Between the side pieces 1 and 2 and separated, as by a spacing-collar 10, differential pulleys 11 and 12 are secured to the shaft 9. I prefer, as specified, but do not limit myself to, the employment of differential pulleys or pulleys operating upon the differential principle. The pulleys 11 and 12 may be of any usual or ordinary construction and carry in the usual manner a chain 13, within the loop of which is supported a pulley-block 15. The shaft 9 is also provided with means of receiving communicated power and is for that purpose provided, preferably, upon its opposite extremities, respectively, with fixed gear-wheels 17 and 18. The gears 17 and 18 mesh, respectively, with fixed pinions 19 and 20 upon opposite ends, respectively, of the power-applying shaft 21.

As a means of driving the shaft 21 I prefer, but do not limit myself to, the employment of a fluid-actuated motor, and I show a form of motor of that description well known in the art and which for that purpose does not require illustration in detail. Suffice it to say by way of explanation that the shaft 21 in this instance is the shaft of the motor-piston, which is incased within the cylinder 22 and which is supported by the shaft in suitable bearings 23, provided for it in the respective cylinder-heads 24.

The shafts 9 and 21 hang in the same perpendicular plane with the cross-head 2 and so distribute the weight evenly upon the frame of the machine and cause it when suspended to hang perpendicularly from the hook 4.

26 indicates a valve-case, between the interior of which and the interior of the cylinder 22 ports 27 and 28 establish communication.

29 indicates a pipe which may be called the "fluid-supply" pipe, and 30 another, which may be called the "fluid-discharge" pipe. Both communicate with the interior of the casing 26, and one may be used as well as the other as a supply or as a discharge.

At a point preferably opposite the case 26 upon the cylinder 22 I provide a lug 31, which carries a cross-piece 32, that is bolted at its opposite ends to the side pieces 1 and 2. The cross-piece 32 not only serves to stiffen the frame, but holds the cylinder and the parts connected therewith in rigidly-fixed relations with the frame side pieces.

The bore of the valve-case 26 is closed by a stuffing-box 33, within which works a valve-stem 34, that is provided with a double-ended hollow valve 35, that works across the ports 27 and 28, respectively. By the shifting of the valve pressure is supplied to one port or the other and converts one into a supply-port and the other into an exhaust-port for the cylinder 22. In each instance the exhaust is made through the hollow of the valve to the pipe 30. By shifting the valve and reversing the functions of the respective ports 27 and 28, as above described, the operation of the motor may be reversed. The opposite ends of the valve 35 are located so that when the valve is in the proper position they will close both ports 27 and 28 at the same time and stop the motor. For holding them in that position I connect the valve-stem, as by means of an arm 36, (see Fig. II,) with a reciprocatory rod 37, working in suitable apertures between opposite end plates 38 of a frame 39, secured, for instance, to the side piece 1.

Around the rod 37 I provide coiled springs 40 and 41, set, respectively, against the end plates 38 of the frame 39 and upon washers 42 and 43, bearing against an intermediate block 44, secured to the rod 37 and preferably working in a guide 44ª, secured to the frame 39. When the opposing forces of the two springs are in equilibrium, the valve 35 closes the ports 27 and 28, and it is designed to work against the force of one spring or the other, for which purpose a lever 45, pivoted as to the outside of the side piece 1, may be connected, as by a link 46, with the rod 37 through a pivotally-connecting member 47. The lever 45 may be operated from the end opposite to that connected with the link 46 by a suspended rod, for example.

The foregoing description applies to Figs. I to III, inclusive, which, as above specified, relate to a single-motor hoist. In Figs. IV and V, I illustrate a double-motor hoist, by the aid whereof the power of the hoist may be greatly increased without materially augmenting the weight or dimensions of the machine.

In the form of embodiment of my invention illustrated in the figures last referred to 51 and 52 indicate the frame side pieces of the machine, which carry upon a shaft 53 gears 54 and 55, the shaft 53 corresponding to the shaft 9 and the gears 54 and 55 corresponding to the gears 17 and 18, previously described. The shaft 53, like the shaft 9, carries a pulley or pulleys, preferably differential pulleys 56.

In place of the single cylinder 22 previously described I provide upon opposite sides of the frame, respectively, cylinders 57 and 58, each of which is provided with a piston-shaft that carries, respectively, pinions 59 and 60, that mesh with the gears 54 and 55. The weight of the multiplied cylinders is applied upon the principle of distribution of the weight of the single cylinder, so as to balance the hoist from the cross-head or other member by which the hoist is suspended.

It will appear from the foregoing that by the employment of a plurality of motors the power applied to the shaft 53 may be indefinitely augmented by the addition only of the increased weight of the motor mechanism.

Both motors are supplied with fluid-pressure from a common supply-pipe 61, which communicates through a branch pipe 62 with valve-cases 63 and 64, respectively. The valve-cases 63 and 64 carry valves similar to the valves 35 and do not, therefore, require further illustration.

65 indicates one valve-stem, and 66 the other. They are respectively connected, as by members 67 and 68, with a common rod 69, carried in supports 70.

The construction of the rod-actuating mechanism and the function of the rod with respect to the two valve-stems 65 and 66 correspond to the valve-actuating mechanism previously described.

The side piece 52 supports a block 77, through which the rod 69 reciprocates. The rod 69 is provided with a fixed washer 78 upon the opposite side of the block 77 from the member 67. Between the member 67, the washer 78, and the intermediate block 77, respectively, are provided coil-springs 79 and 80, their respective ends next to the block 77 being preferably supported by loose washers 81 and 82 on the rod 69.

The rod 69 is operated, as by a crank 71, secured to the end of a hand-rod 72 and movably secured to the rod 69. The means of movably securing the crank 71 to the rod 69, although not of special importance, may be the form of mechanism illustrated at 73 in Figs. IV and V, in which the end of the crank 71 is bifurcated and carries pins working between collars on the rod 69, or, as illustrated in Fig. VI, a crank 74 may be substituted for the crank 71 and may be connected, as to its outer extremity with the rod 69, by an intermediate link 75, pivoted, as indicated at 76, to the end of the crank 74.

As intimated in the general statement contained in the first part of this specification I do not intend in practice to limit myself to the precise details of construction herein described and illustrated, but reserve to myself the right to modify and vary them at will within the scope of my invention, as may be dictated by the preference and skill of the mechanic.

What I claim is—

1. A self-contained hoist comprising a frame fixedly suspensible from a single point, as by means of a cross-head, a pulley, and a motor operatively connected with the pulley and both carried by said frame.

2. A self-contained hoist comprising a suspensible frame, differential pulleys, and a motor operatively connected with said pulleys, and both carried by said frame.

3. In a hoist, the combination with a suspensible frame comprising side pieces, a shaft, differential pulleys secured to the shaft between the side pieces, and gears secured to the shaft on opposite sides of the pulleys, respectively, of a motor carried between the side pieces, its shaft mounted therein, and pinions upon said shaft meshing with the gears upon the pulley-shaft, substantially as set forth.

4. In a hoist, the combination with a frame suspensible from a single point, as by a crosshead, a pulley-shaft, and pulley, of one or more motors and motor shaft or shafts operatively connected with the pulley-shaft, the several parts being so arranged, with respect to the frame, as to equally distribute the weight of the machine upon the frame, substantially as set forth.

5. The combination of frame side pieces, pulley-shaft, pulley thereon, motor, motor-shaft operatively connected with the pulley-shaft, and means of suspension, said means of suspension, motor-shaft, and pulley-shaft being located so as to hang in practice in the same vertical plane, and thereby equally distribute the weight of the machine, substantially as set forth.

6. In a hoist, the combination with a frame, pulley-shaft and pulley thereon, of a plurality of motors and their shafts, and means for operatively connecting the pulley-shaft with the motor-shafts, respectively, substantially as set forth.

7. The combination with a hoist comprising a frame, a fluid-motor and its shaft, a pulley-shaft and pulley thereon operatively connected with the motor-shaft, of a valve-case provided with a pair of ports communicating with the interior of the motor-cylinder, and a valve adapted to convert either of the ports into a supply or a discharge port, substantially as set forth.

8. The combination with a hoist comprising a frame, a fluid-motor and its shaft, a pulley-shaft and pulley thereon operatively connected with the motor-shaft, of a valve-case provided with a pair of ports communicating with the interior of the motor-cylinder, and a spring-balanced valve adapted to convert either of the ports into a supply or discharge port, substantially as set forth.

9. The combination with a hoist comprising a frame, pulley-shaft, pulley thereon, and a plurality of fluid-motors provided with shafts operatively connected with the pulley-shaft, of a common fluid-pressure supply-pipe operatively communicating with the motors, reversing-valves operatively located between the supply-pipe and the respective motors, and common means for actuating the valves, substantially as set forth.

10. The combination with a hoist comprising a frame, pulley-shaft, pulley thereon, and a plurality of fluid-motors provided with shafts operatively connected with the pulley-shaft, of a common fluid-pressure-supply pipe operatively communicating with the motors, spring-balanced valves operatively located between the supply-pipe and the respective motors, and common means for actuating the valves substantially as set forth.

In testimony of all which I have hereunto subscribed my name.

FRANK H. CATHCART.

Witnesses:
 PERCY L. HUESTED,
 WILLIAM CARLOCH.